United States Patent [19]
Roscoe

[11] 3,791,426
[45] Feb. 12, 1974

[54] REED CUTTING MACHINE
[75] Inventor: William A. Roscoe, Rockville, Md.
[73] Assignee: M. M. Meason, Inc., Rockville, Md.
[22] Filed: Nov. 8, 1972
[21] Appl. No.: 304,881

[52] U.S. Cl......... 144/2 R, 144/134 R, 144/309 AA, 90/24.3, 90/32, 90/48
[51] Int. Cl............................ B27m 3/00, B23d 3/06
[58] Field of Search 144/2 R, 134, 137, 142, 309 AA; 90/32, 24.3, 24 R, 38, 48

[56] References Cited
UNITED STATES PATENTS
2,204,871    6/1940    Strand et al. ................. 144/142

Primary Examiner—Gil Weidenfeld
Attorney, Agent, or Firm—Sughrue, Rothwell, Mion, Zinn & Macpeak

[57] ABSTRACT

A curved reed is held on a hollow perforated mandrel having a radius complementary to the radius of the reed by means of a vacuum applied through the interior of the mandrel. The tubular mandrel is shifted axially in one direction while being rotated about its axis through an angle subtended by half the width of the reed and is then shifted axially in the opposite direction to the starting point while being rotated about its axis in the same direction through an angle subtended by half the width of the reed. During the foregoing motion of the reed on the mandrel, a cutter is reciprocated rapidly on the surface of the reed adjacent the middle thereof at an angle to the axis of the mandrel to provide a crescent shaped beveled cut. The cutter is then lifted off the reed and the mandrel is rotated in the opposite direction to its initial starting point for a subsequent cutting operation.

5 Claims, 7 Drawing Figures

PATENTED FEB 12 1974 3,791,426

REED CUTTING MACHINE

BACKGROUND OF THE INVENTION

1. Field of the Invention

The present invention is directed to a machine for cutting reeds of the type used in musical instruments and more specifically to a machine having a reciprocating cutter acting on a workpiece which is simultaneously reciprocated axially relative to the cutter while being rotated about its axis.

2. Prior Art

In the prior manufacture of double reeds suitable for use in the mouthpiece for certain wind instruments such as an oboe or a bassoon, a great deal of the cutting, if not all, was done manually due to the very exacting standards required by professional musicians. This operation generally involved cutting a strip from the Arondo, Donax Reed, approximately two and one-half inches long and a quarter inch wide. The center portion of the reed which has a slight natural curvature along the axis thereof was then scraped with a knife to provide an extremely thin section of reed to the point where the reed became translucent. The scraped or cut section of the reed was uniformly thin across the entire width of the reed at the very center thereof. However, as the cut progressed toward the ends of the reed, the portions of the cut adjacent the edges of the reed, extended further toward the ends of the reed than in the central portion of the reed. The depth of the cut gradually diminished toward the ends of the reed with the total length of the cut being approximately one-half inch. In viewing the cut or scraped portion of the reed in plan view, the opposite ends of the cut would appear as outwardly flared U's with the bights thereof opposed to each other. Thus, due to the complicated nature of the cut necessary for the production of a double reed having acceptable characteristics, the reeds were cut by hand for hundreds of years.

As the demand for double reeds increased, several attempts were made to automate the cutting operation to increase production. Such automated cutting merely involved the use of a reciprocating cutter bearing on the mid-portion of the reed to provide a beveled cut. Although reeds cut in this manner were usable, they were not found to be acceptable by professional musicians who required a much higher standard of performance from the reed. Since it was critical that the outer edges of the cut extend toward the ends of the reed more than the cut in the central portion of the reed in order to provide the requsite vibration characteristics, a supplemental operation had to be performed either by hand or a separate machine to feather the outer edges of the cut toward the opposite ends of the reed. Thus, although the use of machine cutters helped increase production to some degree, numerous machine cutting operations or a mixture of machine and manual cutting operations were needed to produce a high performance reed.

SUMMARY OF THE INVENTION

The present invention provides a machine capable of performing one-half of the complex reed cutting operation in a single automated step.

The present invention provides a cutting machine for double reeds which in addition to having a reciprocating cutter, also has a mandrel for the reeds which is capable of reciprocating and oscillating relative to the cutter, which enables the cutter to perform the complex cutting operation. The mandrel itself is comprised of a hollow tube having perforations therethrough and vacuum means whereby the reed will be held on the mandrel solely by the vacuum to facilitate the rapid positioning and interchanging of reeds.

The present invention provides a cutter having a rapid reciprocating movement along a path which is partially at an angle of approximately 11° relative to the axis of the mandrel and partially along a path parallel to the axis of the mandrel. The cutter is caused to reciprocate along a guide surface by fluid operated means under the control of limit switches which at the end of the cycle will allow the fluid means to move the cutter along the guide surface to a point where the cutter will be out of contact with the reed to facilitate the handling of the reed.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
FIG. 1 is a perspective view of a reed prior to the cutting operation.
Figure 2:
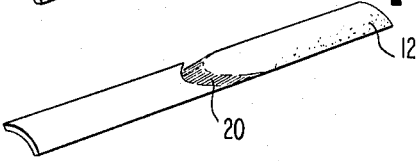
FIG. 2 is a perspective view of the reed at the completion of a single cutting cycle.
Figure 3:
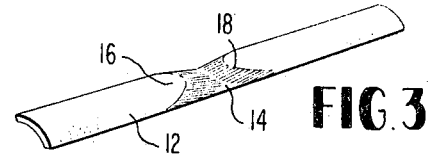
FIG. 3 is a perspective view of the reed after two complete cutting cycles on the machine according to the present invention.
Figure 4:
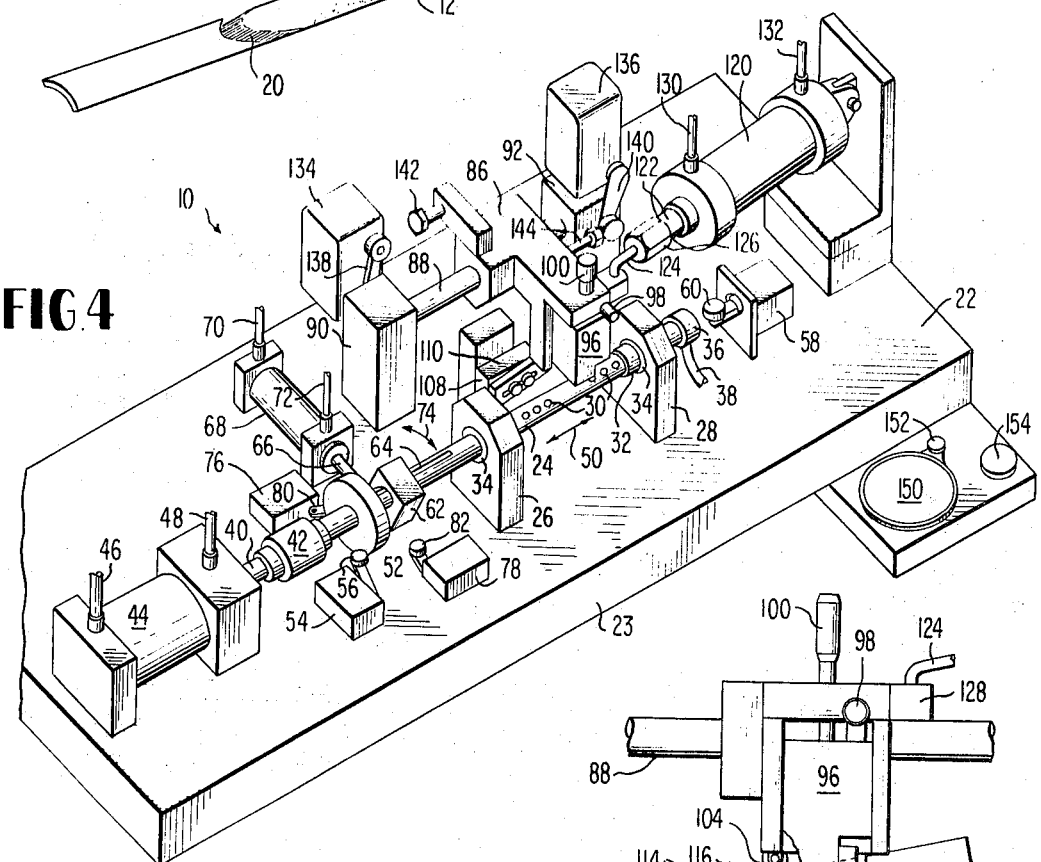
FIG. 4 is a perspective view of the machine according to the present invention.

The cutting machine 10 shown in FIG. 4 is used for cutting the reed 12 in FIG. 1 during the manufacture of double reeds for musical instruments such as the oboe and bassoon. The elongated piece of reed 12 is cut from the Arondo Donax Reed, which is in the form of a hollow tube, which accounts for the curvature of the reed 12 shown in FIG. 1. In the manufacture of double reeds, the central portion of the reed 12 is cut down at the central portion to form a very thin section 14 having a thickness on the order of 0.01mm. The thickness gradually increases in opposite directions toward the ends of the reed 12 with the taper being longer and more gradual along the edges thereof. This results in a thicker central portion at 16 and 18 on the order of 0.45mm. Once the reed is cut, as shown in FIG. 3, the reed is severed into two pieces along a transverse line in the middle of the thin central portion 14. The two thicker ends are then disposed about a hollow tube and secured thereto by means of a wrapping thread with the two thin edges being disposed contiguous to each other. The machine 10, shown in FIG. 4, achieves the final configuration shown in FIG. 3, in two consecutive operations, each of which forms a cut in the reed similar to the cut 20 shown in FIG. 2. In other words, in each operation of the cutting machine 10, half of the cutting takes place with a portion of the second cut overlapping a portion of the first cut.

Figure 6:
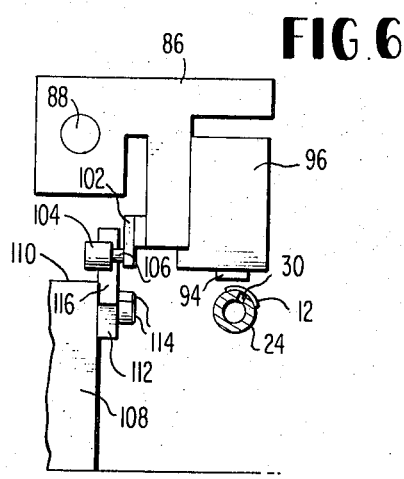
FIG. 6 is a side elevational view of the details shown in FIG. 5.

Turning now to the operation of the machine 10, which is mounted on a base 22, a mandrel 24 is slidably and rotatably mounted for movement in the direction of the arrows in support blocks 26 and 28. The mandrel 24 is formed from a hollow tube, as best shown in FIG. 6 and is provided with two sets of apertures 30, each of which would be disposed adjacent opposite ends of the reed 12, when the reed is placed on the mandrel. Thus, the mandrel presents a solid support surface in the vicinity of the central portion of the reed 12 where the cutting operation is to take place. The mandrel 24 is provided with a pair of integral collars 32 (only one shown) which are disposed in bearings 34 in the blocks 26 and 28. The collars 32, define shoulders against which the opposite ends of the reed 12 may abut to prevent longitudinal movement of the reed relative to the mandrel during cutting operations. An end closure fitting 36 is secured to one end of the mandrel 24 and a conduit 38 is disposed in communication with the interior of the mandrel at one end and is connected to a suitable vacuum source (not shown) at the opposite end. A vacuum on the order of 25–27 inches of mercury is maintained in the mandrel to securely hold the reed on the mandrel during the cutting operation.

The opposite end of the mandrel 24 is connected to a rod 40 by means of a coupling sleeve 42 which also serves to close that end of the hollow mandrel. The rod 40 is connected to the piston (not shown) of a conventional double acting hydraulic motor 44 having inlet conduits 46 and 48 connected thereto at opposite ends. The motor 44 serves to reciprocate the mandrel 24 in the direction of the arrow 50. Since one complete cycle of operation consisting of a forward and return stroke takes approximately 6–8 seconds suitable control means may be provided in the conduits 46 and 48 for regulating the speed of the stroke. A limit plate 52 is secured to the mandrel 24 and limit switch 54 is mounted with the operating lever 56 thereof disposed in the path of the plate 52 for operation thereby. A second limit switch 58 is provided at the opposite end of the mandrel with the operating plunger 60 thereof disposed in direct alignment with the mandrel for operative contact by the end closure fitting 36. The limit switches 54 and 58 are connected through suitable circuitry to solenoid control valves (not shown) which control the flow of fluid in the conduits 46 and 48.

A block 62 is slidably mounted on the mandrel 24 for rotation therewith by means of a splined connection 64. The block 62 is pivotally connected to rod 66 which is secured to the piston (not shown) of the conventional double acting hydraulic motor 68. Conduits 70 and 72 are connected to opposite ends of the motor 68 and to a source of fluid under pressure for reciprocating the rod 66. As with the hydraulic motor 44, the hydraulic motor 66 may be provided with suitable regulating means in the conduits 70 and 72 for regulating the speed at which the rod 66 moves. The rod 66 will complete its forward or extension stroke in the same length of time it takes the rod 40 to complete one cycle of operation. Thus, the mandrel 24 will be rotated counterclockwise as viewed in FIG. 4 in the direction of the arrow 74 while the mandrel 24 is reciprocated through one complete cycle. At the completion of this cycle, a motor 68 is reversed and the piston 66 will rotate the mandrel in the clockwise direction as viewed in FIG. 4 in the direction of the arrow 74. Limit switches 76 and 78 having operating levers 80 and 82 respectively are disposed such that the block 62 will engage the operating levers upon rotation in opposite directions to determine the limits of travel. The limit switches 76 and 78 are connected by suitable circuitry to solenoid valve means (not shown) which in turn control the flow of fluid under pressure in the conduit 70 and 72.

In order to accomplish the cutting of the reed 12 on the mandrel 24, a cutting head 86 is slidably and rotatably mounted on a stationary shaft 88 which is mounted in support blocks 90 and 92. A diamond cutter 94 is secured to a support block 96, which in turn is adjustably secured to the cutting head 86. Suitable caliper type adjusting means 98 and 100 are operatively connected to the mounting block 96 to accurately adjust the position thereof relative to the cutting head 86. An arm 102 is rigidly connected to the cutting head 86 and supports a rotatable roller 104 on a stub shaft 106. A guide block 108 is provided with a flat upper surface 110 which is parallel to the mandrel 24. A guide rail 112 is secured to the guide block 108 by means of a pair of bolts 114 which extend through an elongated slot 116 in the guide rail 112. The width of the slot 116 is considerably larger than the diameter of the shanks of bolts 114 but narrower than the diameter of the heads of the bolts 114. The upper surface of the guide rail 112 is flat and may be disposed at an angle relative to the surface 110 of the guide block 108 by tilting the guide rail 112 relative to the guide block 108 and securing it in position by means of the bolts 114.

The cutter head 86 is reciprocated back and forth in the direction of the arrows 50 by means of a fluid motor 120. The piston rod 122 of the motor is connected to a hook shaped rod 124 by means of a coupler 126. The outermost end of the hook shaped rod 124 is disposed in an aperture formed in a connecting block 128 secured to the cutting head 86. Hydraulic fluid under pressure of approximately 350 lbs. per square inch is applied alternately through conduits 130 and 132 to reciprocate the piston rod and in turn reciprocate the cutting head 86. In order to switch the flow of fluid between the conduits 130 and 132, a pair of limit switches 134 and 136 are provided which in turn control a solenoid operated valve (not shown) in the fluid circuitry leading to the conduits 130 and 132. The limit switches 134 and 136 are each provided with pivoted operating levers 138 and 140 respectively. A pair of adjustable limit stops 142 and 144 are secured to the cutting head 86 for engagement with the operating levers 138 and 140 respectively upon reciprocation of the cutting head 86.

Figure 5:
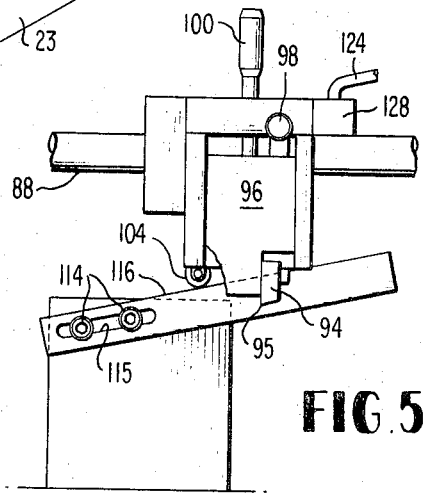
FIG. 5 is a partial elevational view showing the details of the guide arrangement for the cutting head.

The weight of the cutting head 86 is sufficient to pivot the cutting head in a clockwise direction about the shaft 88 as viewed in FIG. 4 within the limits dictated by the guide surfaces 110 and 116. When the roller 104, which is of sufficient axial length to engage both surfaces 110 and 116, travels downwardly along the guide surface 116 and laterally along the guide surface 110, a cutting operation will be performed by the diamond cutter 94 on the reed 12. The leading edge 95 of the cutter 94 does the actual cutting as the cutter moves from right to left as viewed in FIG. 5.

The trailing edge of the underside of the cutter is disposed at approximately a 10° angle relative to the horizontal so as not to interfere with the cutting action of the leading edge 95. As pointed out previously, the angle of the guide surface 116 may be varied relative to the guide surface 110 but the optimum angle is approximately 11°. Thus, as the guide roller 104 travels to the left along the guide surface 116, the beveled edge of the cut shown in FIGS. 2 and 3, will be formed in the reed and as the roller 104 moves on to the horizontal surface 110, which is parallel to the mandrel, the central portion of the reed will be cut to an extremely thin thickness as indicated by the area 14 in FIG. 3. When the roller 104 moves to the right, as viewed in FIG. 5 upwardly along the guide surface 116, beyond the position dictated by the limit switch 136, the cutter will be raised out of engagement with the reed to allow the removal of one reed and the insertion of another reed.

A complete cutting cycle will now be described in detail with reference to the above-described apparatus. In the normal rest position, the mandrel 24 is disposed with the apertures 30 angled slightly toward the front edge 23 of the base 22 where the operator will normally be positioned. At this time, the piston 66 is retracted and the block 62 is in engagement with the operating lever 80 of the limit-switch 76. Also, at this time, the mandrel 24 is moved to its extreme left position as shown in FIG. 4 with the limit plate 52 disposed in operative contact with the operating lever 56 of limit switch 54. The piston rod 122 of hydraulic motor 120 is retracted to its fullest extent with the adjustable limit screw 144 in engagement with the operating lever 140 of limit switch 136. The limit switch operating lever 140 is provided with sufficient play so that at this time the lever 140 will be beyond the position at which the switch will be actuated. Thus, the cutting head 86 will be disposed in its extreme righthand position with the roller 104 contacting the upper portion of the guide surface 116 so that the cutter 94 is substantially removed from the mandrel at a distance much greater than the thickness of the reed 12 to be placed on the mandrel.

With a vacuum applied through the line 38 to the ports 30 in the mandrel 24, the operator will then place a reed 12, as shown in FIG. 1, over the apertures 30 with the ends thereof disposed in contact with the shoulders 32. A timing clock, 150, is connected in the circuit with the right-hand limit switch 136 and a push button switch 152 is associated with the clock 150 to initiate the operation of the same and the operation of the hydraulic motor 120. The clock 150 may be set for any desirable number of seconds and as previously pointed out the normal period of operation will last for a period of 6 to 8 seconds. When the switch 152 is pushed, the limit switch 136 will be in a position to direct the flow of fluid through the conduit 132 to extend the piston rod 122. Thereafter, the piston rod 122 and the cutter will reciprocate within the limits defined by the two limit switches 134 and 136 until the timer 150 overrides the limit switch 136 and shuts off the hydraulic motor 120 with the piston rod 122 completely restracted. A second switch 154 is disposed adjacent the switch 152 and is electrically tied to the left-hand limit switch 54 and the back limit switch 76. Thus, upon closing of the switch 154, the switches 54 and 76 will be in the position whereby fluid under pressure will be directed to the conduit 46 of motor 44 to shift the mandrel to the right as viewed in FIG. 4 and to the conduit 70 of the motor 68 to extend the piston rod 66 and rotate the mandrel 24 in the counterclockwise direction as viewed in FIG. 4.

Figure 7:
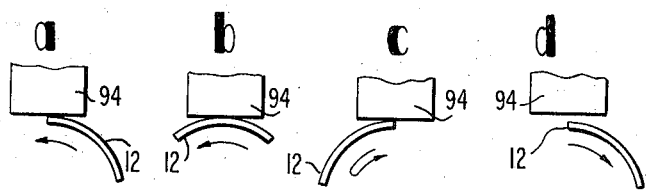
FIG. 7A–D are four schematic views showing the relative positions of the reed and cutter at four different stages in the cutting cycle.

At the beginning of a cycle, when the cutter 94 first makes contact with the reed 12, the relative positions of the cutter and reed are as shown in FIG. 7A. This view is similar to the view in FIG. 6. While the cutter 94 is reciprocating rapidly at a rate of approximately 8 strokes per second, the mandrel is shifted relatively slowly to the right while being rotated in a counterclockwise direction as viewed in FIG. 4 and 7. When the mandrel 24 reaches its righthand limit of reciprocating movement, the limit switch 58 will be operated to shift the flow of fluid under pressure from the conduit 46 to the conduit 48. At this moment, the relative positions of the cutter 94 and the reed 12 are as shown in FIG. 7B. As the mandrel 24 begins its return stroke toward the left as viewed in FIG. 4, the mandrel 24 will continue to rotate in a counterclockwise direction as indicated by the arrow in FIG. 7B. When the mandrel reaches its left limit, the limit switch 54 will be actuated to shut off the motor 44 and change-over the solenoid valve so that upon initiation of a subsequent cycle, the fluid will be directed through the conduit 46. Simultaneously, with the actuation of the limit switch 54, the limit switch 76 will be operated by the block 72 to operate the solenoid and change the flow of fluid under pressure from the conduit 70 to the conduit 72. Also, at the same moment, the clock 150 will time out to override the limit switch and shut off the flow of fluid under pressure to the motor 120 so that the piston rod will remain in its fully retracted position with the cutter out of engagement with the reed. At that moment, just prior to the timing out of the switch 150, the relative positions of the cutter 94 and the reed 12 are as shown in FIG. 7C. With the cutter 94 retracted out of engagement with the reed 12, motor 68 will be operating in the opposite direction and the mandrel 24 will be rotated in the clockwise direction until it reaches the position shown in FIG. 7D whereupon the limit switch 76 will be operated to shut off the flow of fluid to the conduit 72 and precondition the solenoid so that upon initiation of the subsequent cycle, the fluid will be directed through the conduit 70. With the mandrel returned to the position shown in FIG. 7D, the operator can readily remove the reed which has a cut similar to that shown at 20 in FIG. 2 and reverse the reed end for end upon the mandrel and begin a subsequent cutting cycle to provide an overlapping cut opposed to the first cut.

While the invention has been particularly shown and described with reference to a preferred embodiment thereof, it will be understood by those in the art, that various changes in form and detail may be made therein without departing from the spirit and scope of the invention.

What is claimed is:

1. A reed cutting machine comprising a mandrel having an axis for supporting a reed, means for holding said reed on said mandrel, means for reciprocating said mandrel along said axis, means for oscillating said mandrel about said axis, cutting means, means mounting said cutting means for reciprocating and oscillating movement relative to an axis parallel to the axis of said mandrel while maintaining said cutting means in cutting engagement with a reed on said mandrel during reciprocation and rotation of said mandrel.

2. A reed cutting machine as set forth in claim 1 further comprising guide means for said cutting means including a first surface parallel to the axis of said mandrel and a second surface contiguous to said first surface and disposed at an acute angle relative thereto and follower means secured to said cutting means and contacting said first and second surfaces during reciprocating movement of said cutting means.

3. A reed cutting machine as set forth in claim 1 wherein said mandrel is comprised of a hollow cylindrical tube having at least one aperture therethrough at opposite ends of the area along which said cutting means reciprocates and vacuum means for applying a vacuum to the interior of said mandrel for holding a reed on said mandrel over said apertures.

4. A reed cutting machine as set forth in claim 1 wherein said means for reciprocating said mandrel along said axis reciprocates said mandrel through one complete reciprocation while said means for oscillating said mandrel of said axis rotates said mandrel in one direction through a predetermined angle and while said cutting means is reciprocated a predetermined number of times to form a substantially U-shaped cut in a reed.

5. A reed cutting machine as set forth in claim 4 further comprising means for moving said cutting means out of engagement with a reed on said mandrel at the completion of the cutting operation and means for rotating said mandrel about its axis through said predetermined angle in the opposite direction at the termination of the cutting operation.

* * * * *